US006913377B2

(12) United States Patent
Ishida et al.

(10) Patent No.: US 6,913,377 B2
(45) Date of Patent: Jul. 5, 2005

(54) PROJECTION-TYPE VEHICULAR HEADLAMP

(75) Inventors: Hiroyuki Ishida, Shizuoka (JP); Naoki Uchida, Shizuoka (JP); Kenichi Takada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/391,550

(22) Filed: Mar. 20, 2003

(65) Prior Publication Data

US 2003/0185017 A1 Oct. 2, 2003

(30) Foreign Application Priority Data

Mar. 27, 2002 (JP) ..................................... P.2002-089406

(51) Int. Cl.[7] .............................. F21V 7/00; B60Q 1/04

(52) U.S. Cl. ........................ 362/539; 362/517; 362/297

(58) Field of Search ................................ 362/539, 517, 362/297, 538, 516, 518, 519, 263, 304, 328, 346, 348, 347, 303

(56) References Cited

U.S. PATENT DOCUMENTS 3,184,591 A * 5/1965 Cibie ......................... 362/317
4,772,948 A 9/1988 Kretschmer et al.
4,772,987 A 9/1988 Kretschmer et al.
4,918,580 A * 4/1990 Nino .......................... 362/539
4,964,021 A * 10/1990 Masin ........................ 362/538
5,055,981 A * 10/1991 Nino .......................... 362/539
5,967,647 A 10/1999 Eichler
6,435,703 B2 * 8/2002 Takada ....................... 362/517
6,626,565 B2 * 9/2003 Ishida ........................ 362/514

FOREIGN PATENT DOCUMENTS

DE 40 10 830 A1 10/1991

* cited by examiner

*Primary Examiner*—Thomas M. Sember
*Assistant Examiner*—Bao Q. Truong
(74) *Attorney, Agent, or Firm*—Sughrue Mion, PLLC

(57) ABSTRACT

A projection-type headlamp producing a low-beam light distribution pattern having a cut-off line and which provides improved visibility for the driver of the vehicle with a reduced possibility of inflicting glare on drivers of oncoming vehicles. A low-beam light distribution pattern is synthesized from a base light distribution pattern, formed by a projection-type lamp unit, and a pair of additional light distribution patterns, formed by light reflected from a pair of additional reflectors provided on right and left sides of a lamp unit body. The additional light distribution patterns are superimposed on a horizontal cut-off line having a level difference within the base light distribution pattern. The contrast between the area above the horizontal cut-off line and the area below the horizontal cut-off line is accordingly reduced.

19 Claims, 6 Drawing Sheets

PROJECTION-TYPE VEHICULAR HEADLAMP

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a so-called projection-type vehicular headlamp. More particularly, the present invention relates to a projection-type vehicular headlamp which provides a low-beam light distribution pattern having a predetermined cut-off line.

Generally, in a projection-type vehicular headlamp a reflector reflects light from a light source mounted on an optical axis extending in the longitudinal direction of the vehicle forward in the direction of the optical axis, and the reflected light is radiated forward of the lamp through a projection lens provided ahead of the reflector.

When this projection-type vehicular headlamp is configured for use in generating a low beam, as shown in FIG. 6, the light distribution pattern P' has a cut-off line CL' formed by providing a shade 6 between the projection lens 2 and the reflector 4 to block part of the light reflected from the reflector 4.

The contrast between the area above the cut-off line CL' and the area below the cut-off line CL' in the low-beam light distribution pattern P' is considerably high since the cut-off line CL' is formed as a sharp reverse projection image of the shade 6.

Accordingly, when, for example, the vehicle on which the headlamp is mounted is moving from a downward slope to a flat road surface, the road surface ahead of the vehicle may be dark and visibility on the distant road surface may be insufficient (depending on vehicle speed), which makes it difficult for a driver to safely operate the vehicle. Moreover, if the cut-off line CL' moves up and down slightly due to pitching of the vehicle or the like, the light intensity changes abruptly, which may inflict glare on drivers of oncoming vehicles.

BRIEF SUMMARY OF THE INVENTION

The present invention was made in consideration of such circumstances. It is an object of the present invention to provide a projection-type vehicular headlamp which provides a low-beam light distribution pattern having a predetermined cut-off line, wherein the low-beam light distribution pattern allows the driver of the vehicle to drive easily and safely, and has a low possibility of causing glare for drivers of oncoming vehicles.

The present invention attains this and other objects by providing at least one additional reflector to the side of the main reflector so as to form an additional light distribution pattern extending along the cut-off line.

Namely, a vehicular headlamp according to the present invention includes a light source mounted on an optical axis extending generally in the longitudinal direction of the vehicle, a main reflector that reflects light from the light source forward along the optical axis, a projection lens disposed forward of the reflector, and a shade provided between the projection lens and the reflector which blocks part of the light reflected by the reflector thereby to provide a low-beam light distribution pattern having a predetermined cut-off line. Further in accordance with the invention, an additional reflector is provided to the side of the main reflector which forms an additional light distribution pattern superimposed on the cut-off line.

The specific configuration of the light source is not particularly limited. The light source may be a discharge light source of a discharge bulb, a filament of an incandescent bulb such as a halogen bulb, or the like.

The specific form of the cut-off line is not particularly limited. For example, a form constituted by a horizontal cut-off line and an oblique cut-off line, a form constituted by right and left pairs of horizontal cut-off lines formed with or without a level difference therebetween, or the like can be employed.

The additional light distribution pattern is not particularly limited in form, size or light intensity distribution as long as the additional light distribution pattern is formed superimposed on the cut-off line.

With the projection-type vehicular headlamp according to the present invention, wherein part of the light reflected from the main reflector is blocked by a shade provided between the projection lens and the main reflector so as to provide a low-beam light distribution pattern having a predetermined cut-off line, and wherein an additional reflector which reflects light from the light source to provide an additional light distribution pattern extending over and along the cut-off line is provided to the side of the main reflector, the following effects are obtained.

Namely, since the low-beam light distribution pattern includes the additional light distribution pattern superimposed on the cut-off line, the contrast between the area above the cut-off line and the area below the cut-off line is reduced. Thus, even when the vehicle is moving from a downward slope to a flat road surface, the road surface ahead is prevented from suddenly becoming dark, and deterioration of visibility on the distant road surface is suppressed. Also, even when the horizontal cut-off line moves up and down due to a pitching of the vehicle or the like, the light intensity is prevented from abruptly changing. Accordingly, the possibility of inflicting glare on the drivers of oncoming vehicles is decreased.

In addition, even if the position of the light source deviates slightly in the direction of the optical axis due to the provision of the additional reflector on the side of the main reflector, the additional light distribution pattern is prevented from being displaced in the vertical direction. Accordingly, the additional light distribution pattern can be formed on the cut-off line with reliability.

Thus, in the projection-type vehicular headlamp of the present invention, a low-beam light distribution pattern having a predetermined cut-off line is obtained which provides improved visibility for the driver while preventing glare for the drivers on oncoming vehicles.

As mentioned above, the specific configuration of the additional light distribution pattern is not particularly limited. However, if the additional light distribution pattern is formed so as to extend along the cut-off line and is formed so as to intersect the cut-off line in the vicinity of its upper edge, the contrast between the area above the cut-off line and the area below the cut-off line can be reduced over a broad range, and also a hot zone (an area of high-intensity light) extending along the cut-off line can be formed below the cut-off line. Generally, the light intensity distribution of the low-beam light distribution pattern which is formed by a projection-type vehicular headlamp is substantially uniform, and a hot zone is difficult to form. Accordingly, employing the configuration of the invention is especially effective in view of enhancing visibility for the driver of the subject vehicle.

Also, in the above-mentioned configuration, if an aperture for allowing light from the light source to strike the additional reflector is provided in the main reflector, the following effects can be obtained.

Namely, the additional reflector can be arranged such that the light from the light source which strikes the additional reflector passes through a space between the projection lens and the reflector, as long as the additional reflector is provided on the side of the reflector. When arranged in this way, since the additional reflector is arranged at a position which is considerably distant from the light source, the additional light distribution pattern which is formed by the reflected light from the additional reflector has a high light intensity and small size. Thus, when the small additional light distribution pattern with high light intensity is formed along the cut-off line, there is a possibility of causing glare for the drivers of oncoming vehicles because light more luminous than what is actually required falls on the area above the cut-off line.

However, when an aperture for allowing light from the light source to reach the additional reflector is provided in the reflector, since the additional reflector can be arranged at a position which is relatively close to the light source, a relatively large sized additional light distribution pattern with a relatively low light intensity can be obtained. Accordingly, light which is more luminous than actually required is prevented from being radiated to the area above the cut-off line, and the possibility of inflicting glare on the drivers of oncoming vehicles is further decreased. Further, in this case the reflected light from a portion which corresponds to the aperture of the reflector is replaced by light reflected by the additional reflector. Accordingly, the contrast between the area above the cut-off line and the area below the cut-off line is reduced due to the light reflected from the additional reflector, while additionally the contrast between the area above the cut-off line and the area below the cut-off line is reduced by the light reflected from the portion that corresponds to the aperture.

In the projection-type headlamp of the invention, by providing a pair of additional reflectors on opposed sides of the reflector so as to form a pair of the additional light distribution patterns, the effect of reducing the contrast between the area above the cut-off line and the area below the cut-off line is further enhanced. In such a case, a pair of additional light distribution patterns formed by the light reflected from the two additional reflectors may be superimposed at substantially the same position relative to the cut-off line, or they may be formed at different positions with respect to the cut-off line.

DETAILED DESCRIPTION OF THE INVENTION

A preferred embodiment constructed according to the present invention will now be described with reference to accompanying drawings.

Figure 1:
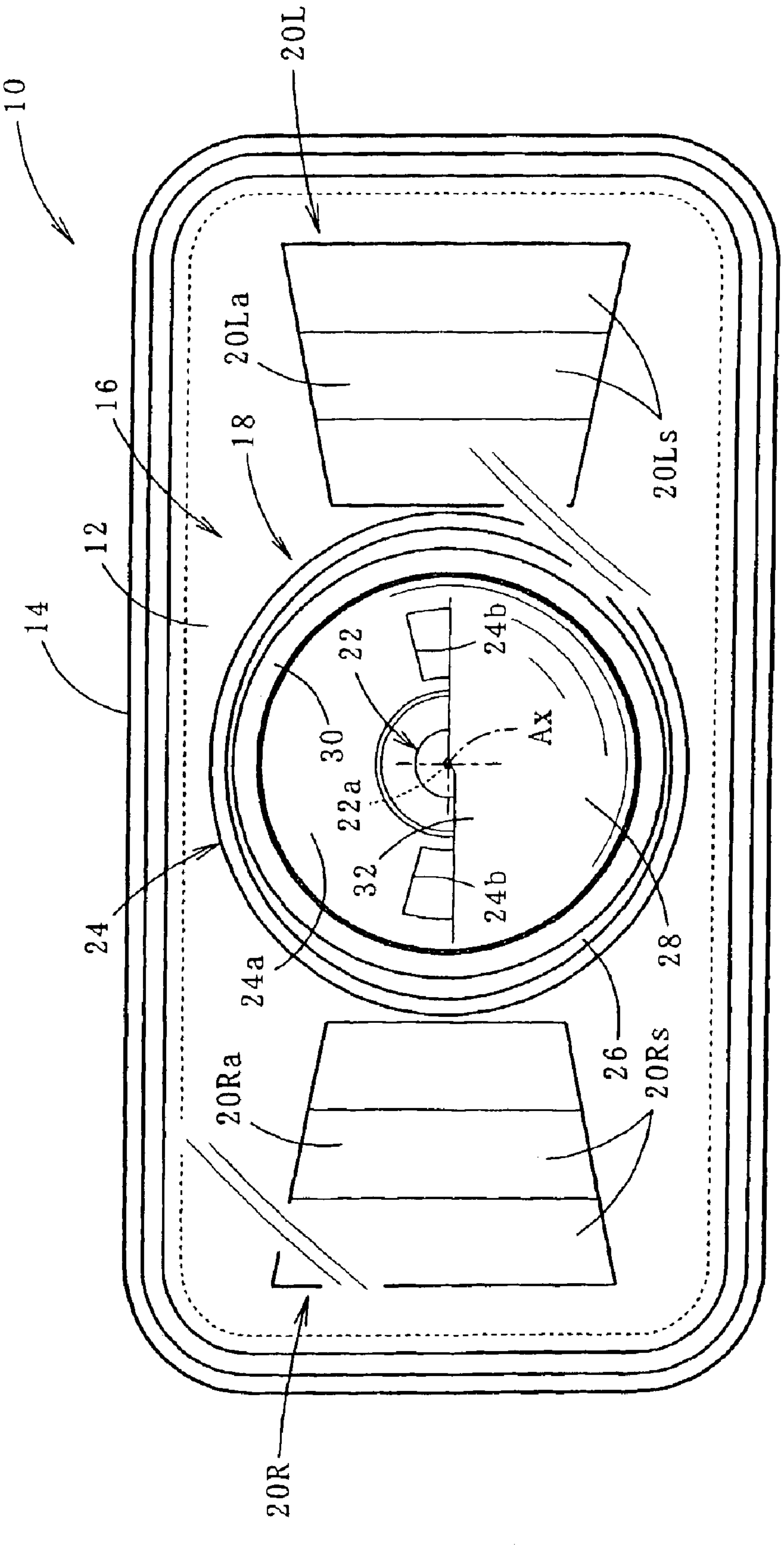
FIG. 1 is a front view showing a vehicular headlamp constructed according to a preferred embodiment of the present invention.
Figure 2:
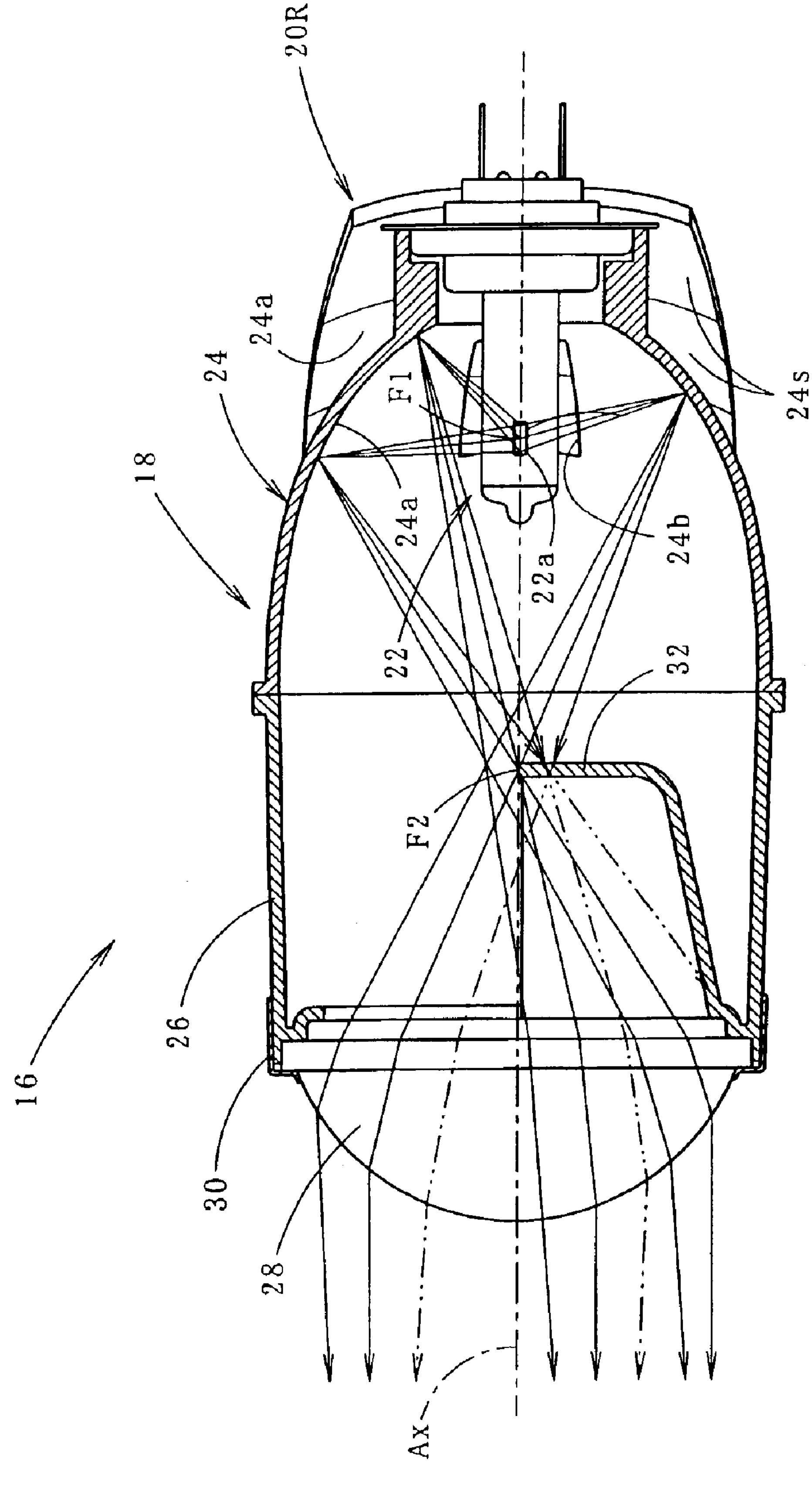
FIG. 2 is a vertical sectional view showing a lamp unit of the vehicular headlamp of FIG. 1.
Figure 3:
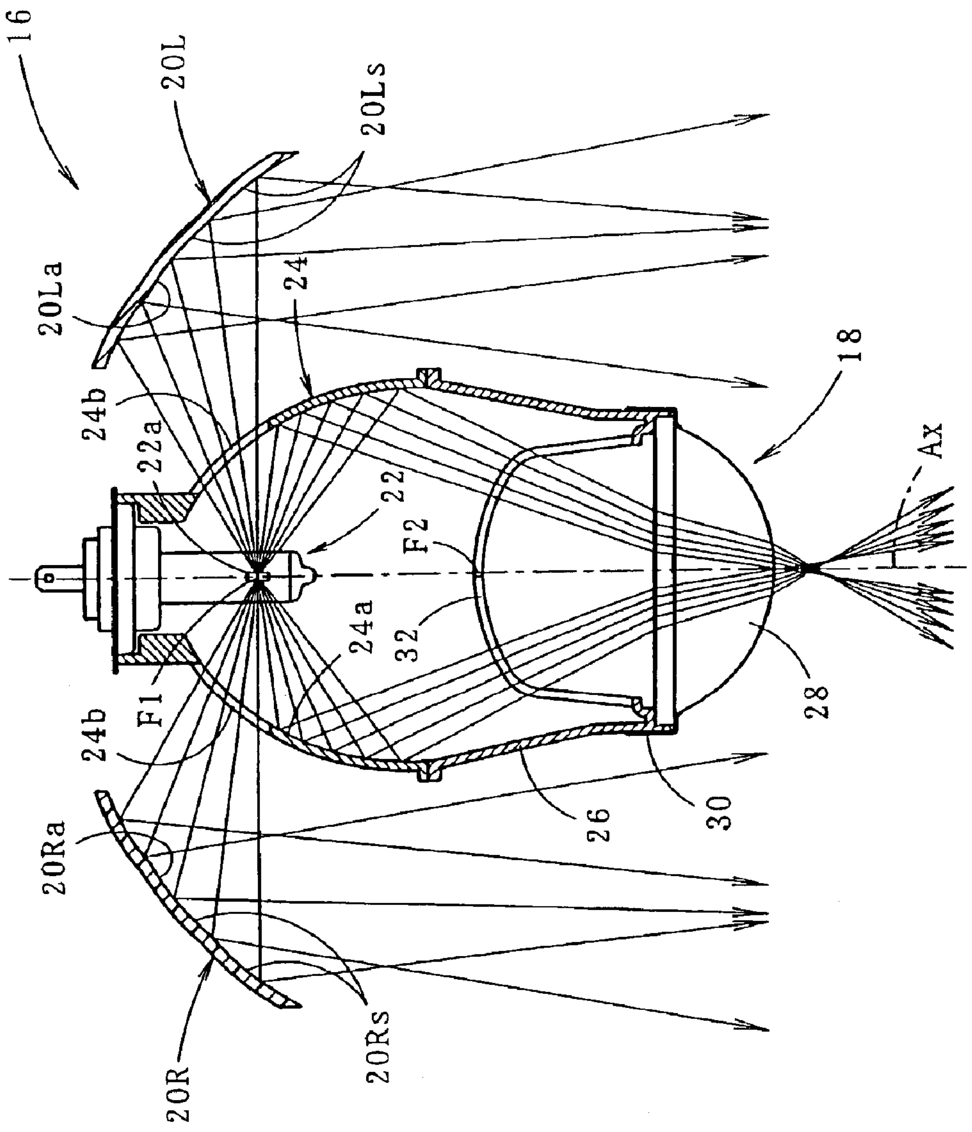
FIG. 3 is a horizontal sectional view showing the lamp unit of FIG. 2.

FIG. 1 is a front view showing a vehicular headlamp constructed according to a preferred embodiment of the present invention. FIGS. 2 and 3 are a vertical sectional view and a horizontal sectional view, respectively, showing main portions of the vehicular headlamp of FIG. 1.

As shown in these drawings, a vehicular headlamp 10 includes a lamp unit 16 housed in a lamp chamber constituted by a translucent transparent cover 12 and a lamp body 14. The headlamp 10 of this example is constructed so as to produce a low-beam light distribution pattern for driving on the left-hand side of the road, although of course the same principles apply for a headlamp designed for driving on the right-hand side of the road.

The lamp unit 16 includes a lamp unit body 18 and a pair of additional reflectors 20L, 20R provided on right and left sides of the lamp unit body 18. The lamp unit 16 is supported by the lamp body 14 so as to be tiltably adjustable in vertical and lateral directions using an aiming mechanism (not shown).

The lamp unit body 18 is a projection-type lamp which includes a light source bulb 22, a reflector 24, a holder 26, a projection lens 28, a retaining ring 30, and a shade 32.

The light source bulb 22, which may be a type H7 halogen bulb, is attached to the reflector 24 in such a manner that the filament 22*a* (light source) of the bulb extends coaxially along an optical axis Ax which extends generally in the longitudinal direction of the vehicle, preferably in a direction downward by approximately 0.5 to 0.6 degrees with respect to the longitudinal direction of the vehicle.

The reflector 24 has a reflecting surface 24*a* having the shape of an ellipsoid of revolution whose central axis is the optical axis Ax. The reflecting surface 24*a* is formed such that its cross-section in a plane including the optical axis Ax is an ellipse, and with its eccentricity gradually increasing from a vertical cross section toward a horizontal cross section. The rear apexes of the ellipses which form these cross sections are at the same position. The light source 22*a* is arranged at a first focus F1 of the ellipse taken through the vertical cross section of the reflecting surface 24*a*. Accordingly, the reflecting surface 24*a* reflects light from the light source 22*a* forward along the optical axis Ax. The light is substantially converged at a second focus F2 of the ellipse in the vertical cross section including the optical axis Ax.

A pair of apertures 24*b* is formed on respective right and left sides of the reflector 24 (portions on both the right and left sides of the optical axis Ax in the reflecting surface 24*a*) for allowing the light from the light source 22*a* to reach the reflecting surfaces 20La, 20Ra of additional reflectors 20L, 20R.

The holder 26, which has a cylindrical form, extends forward from a front end portion of the reflector 24 and is fixedly supported by the reflector 24. The holder 26 fixedly supports the projection lens 28 through the retaining ring 30 at a front portion thereof.

The projection lens 28 is constituted by a planoconvex lens whose front surface is a convex surface and whose rear surface is a concave surface. The projection lens 28 is arranged such that the position of the rear focus of the lens coincides with the second focus F2 of the reflecting surface 24*a* of the reflector 24. Accordingly, the projection lens 28 allows the reflected light from the reflecting surface 24*a* of the reflector 24 to pass therethrough such that the reflected light converges along the optical axis Ax.

The shade 32 is positioned between the projection lens 28 and the reflector 24, and thus blocks part of the light reflected from the reflecting surface 24*a* of the reflector 24 from reaching the projection lens 28. The shade 32 extends substantially along a vertical surface which is orthogonal to the optical axis Ax, and is arranged such that an upper edge thereof which extends horizontally and has a level difference between right and left sides passes through the second focus F2. The shade 32 thereby removes light radiated upward from the lamp unit body 18 by blocking part of the light reflected from the reflecting surface 24*a*. Accordingly, light for forming a low beam which is radiated downward with respect to the optical axis Ax is obtained.

Each of the additional reflectors 20L, 20R is fixedly supported by the lamp unit body 18. The reflecting surfaces 20La, 20Ra of the reflectors 20L, 20R are constituted by a plurality of reflecting elements 20Ls, 20Rs, formed using a paraboloid of revolution whose focus is the first focus F1 of the reflector 24 as a reference surface. The reflecting elements 20Ls, 20Rs diffuse and reflect the light from the light source 22*a* forward and in a lateral direction.

Figure 4:
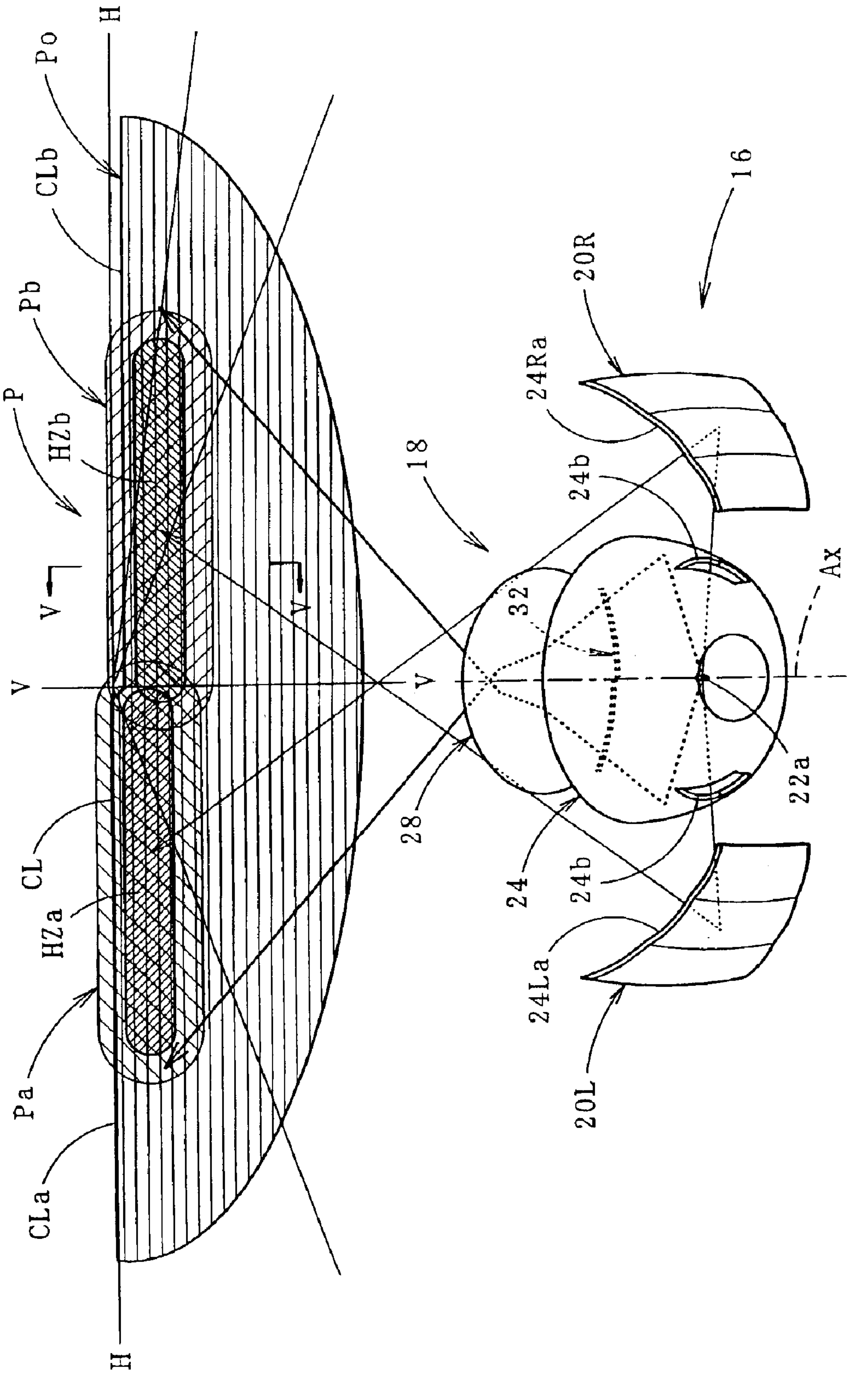
FIG. 4 is a perspective view showing a low-beam light distribution pattern produced by the lamp unit formed on a virtual vertical screen at a position 25 m ahead of the lamp, as well as the lamp unit when seen from the rear side thereof.

FIG. 4 is a perspective view showing a low-beam light distribution pattern P formed on a virtual vertical screen set at a position 25 m ahead of the lamp by the beam radiated forward from the lamp unit 16, and the lamp unit 16 when seen from the rear.

A low-beam light distribution pattern P is formed as a synthetic light distribution pattern composed of a base light distribution pattern Po and a pair of additional light distribution patterns Pa, Pb.

The base light distribution pattern Po, which is formed by beam radiation from the lamp unit body 18, has a horizontal cut-off line CL which has a level difference between right and left sides thereof along its upper edge.

The horizontal cut-off line CL having the level difference is formed such that the left side thereof (traveling lane side) with respect to the H-V intersection, namely, its upper level portion CLa, is substantially coincident with the line H—H (a horizontal line which passes through the H-V intersection), and the right side thereof (oncoming lane side) with respect to the H-V intersection, namely, its lower level portion CLb, is at a position slightly below (0.5 to 0.6 degrees below) the line H—H.

The additional light distribution pattern Pa is formed by light reflected from the right additional reflector 20R. The additional light distribution pattern Pa extends along the upper level portion CLa of the horizontal cut-off line CL, and is formed so as to intersect the upper level portion CLa in the vicinity of the upper edge of the additional light distribution pattern Pa.

The additional light distribution pattern Pb is formed by light reflected from the left additional reflector 20L. The additional light distribution pattern Pb extends along the lower level portion CLb of the horizontal cut-off line CL, and is formed so as to intersect the lower level portion CLb in the vicinity of the upper edge of the additional light distribution pattern Pb.

Figure 5:
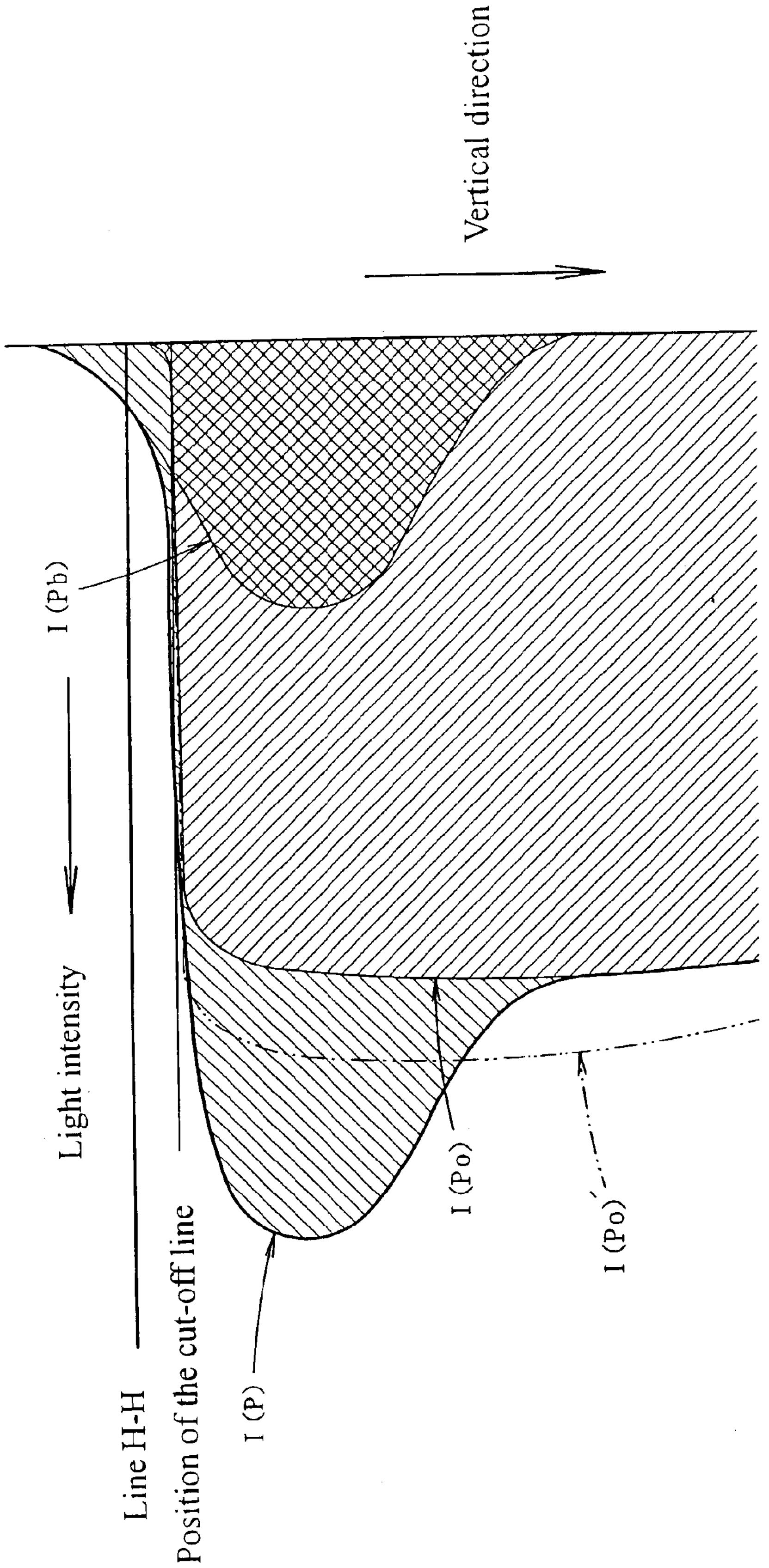
FIG. 5 is an enlarged cross-sectional view taken along a line V—V in FIG. 4 showing the light intensity distribution in a vertical direction in the low-beam light distribution pattern.
Figure 6:
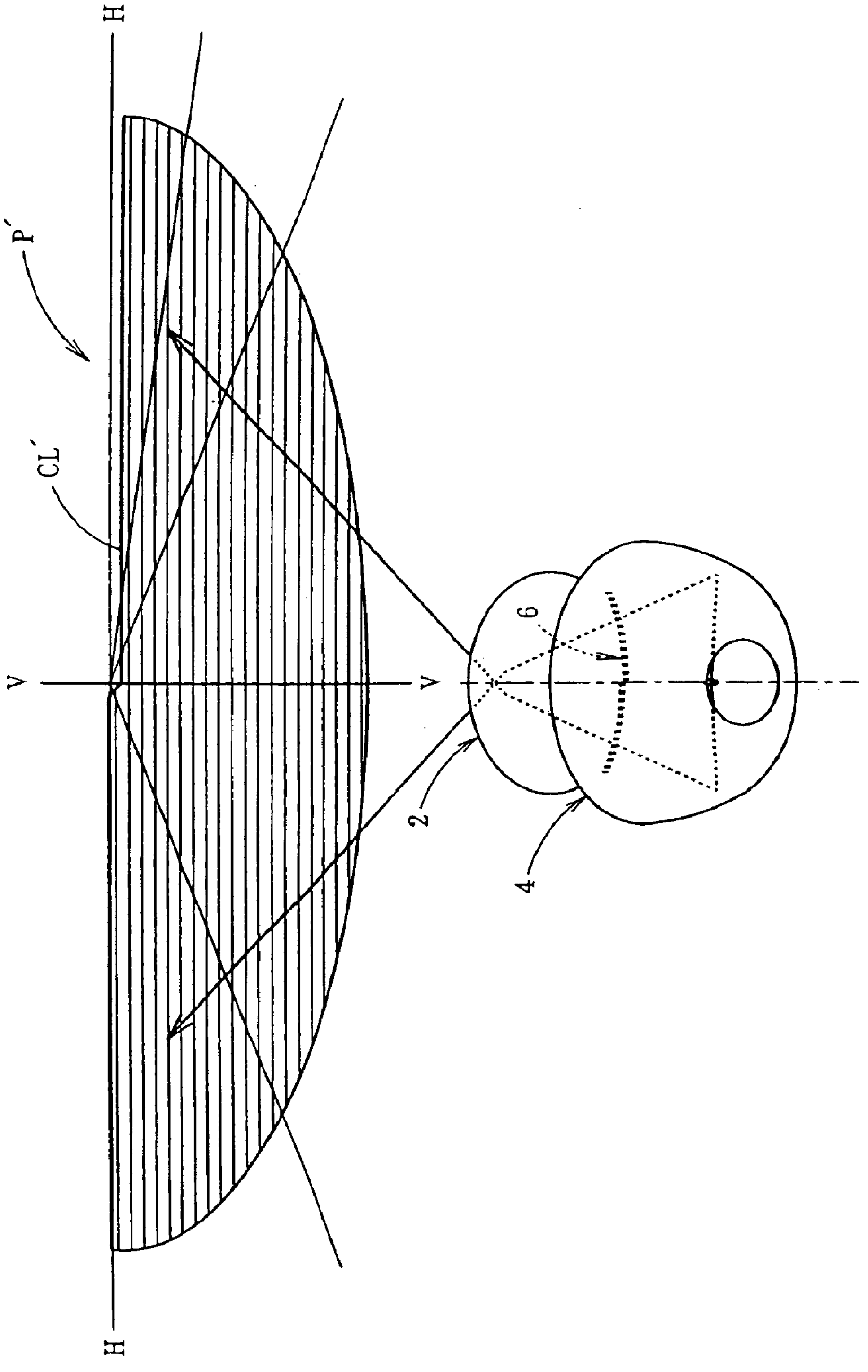
FIG. 6 PRIOR ART
FIG. 6 is a diagram similar to FIG. 4 but showing a conventional headlamp.

FIG. 5 is a cross-sectional view taken along the line V—V in FIG. 4 showing the light intensity distribution of the low-beam light distribution pattern P in the lower level portion CLb of the horizontal cut-off line CL in the vertical direction.

As shown in this diagram, the light intensity distribution I (PO) of the base light distribution pattern Po and the light intensity distribution I (Pb) of the additional light distribution pattern Pb are superimposed to form the light intensity distribution I (P) of the low-beam light distribution pattern P.

In the base light distribution pattern Po, since the horizontal cut-off line CL is formed as a sharp reverse projection image of the shade 32, the light intensity abruptly changes at the position of the cut-off-line (specifically, the position of the lower level portion CLb) in the light intensity distribution I (Po). However, since apertures 24*b* are formed on both sides of the reflector 24, the amount of change of the light intensity at the position of the cut-off line is reduced by the reflected light from portions of the reflector 24 corresponding to the two apertures 24*b*, and thus the contrast between the area above the horizontal cut-off line CL and the area below the horizontal cut-off line CL is reduced. The light intensity distribution I (Po)' indicated by a chain doubledashed line in the diagram is the light intensity distribution of the base light distribution pattern Po on the assumption that the two apertures 24*b* are not formed in the sides of the reflector 24 (that is, when the lamp unit body 18 is an ordinary projection-type lamp).

The light intensity changes relatively gradually within the light intensity distribution I (Pb) of the additional light distribution pattern Pb. The additional light distribution pattern Pb is formed such that the position of the highest light intensity is slightly below the position of the cut-off line and the upper edge of the pattern Pb extends above the cut-off line.

The light intensity distribution I (Po) and the light intensity distribution I (Pb) are superimposed within the light intensity distribution I (P) of the low-beam light distribution pattern P. Accordingly, the inclination of the light intensity at the position of the cut-off line is gradual compared with the light intensity distribution I (Po)' in the case where the lamp unit body 18 is an ordinary projection-type lamp. Also, the upper edge of the light intensity distribution extends to a position slightly above the cut-off line while the light intensity gradually decreases. The light intensity increases below the cut-off line.

As a result, as shown in FIG. 4, the lower level portion CLb of the horizontal cut-off line CL is rendered appropriately indistinct, and a hot zone HZb is formed along the lower level portion CLb below the horizontal cut-off line CL.

The light intensity distribution of the low-beam light distribution pattern P in the vertical direction in the upper level portion CLa of the horizontal cut-off line CL is the same as that in the lower level portion CLb. Accordingly, as shown in FIG. 4, the lower level portion CLa of the horizontal cut-off line CL is rendered appropriately indistinct, and a hot zone Hza is formed along the upper level portion CLa below the horizontal cut-off line CL.

As described above in detail, the vehicular headlamp 10 including the lamp unit 16 constructed according to the preferred embodiment provides a low-beam light distribution pattern having a horizontal cut-off line CL with a level difference. The lamp unit 16 includes the projection-type lamp unit body 18 which produces the base light distribution pattern Po, and the pair of additional reflectors 20L, 20R which are provided on right and left sides of the lamp unit body 18 and which form the additional light distribution patterns Pa, Pb in the vicinity of the horizontal cut-off line CL by reflecting light from the light source 22*a* of the lamp unit body 18 in the forward direction. With this structure, the following effects can be obtained.

Namely, the low-beam light distribution pattern P is formed as a synthesized pattern of the base light distribution pattern Po and the pair of additional light distribution patterns Pa, Pb. Since the additional light distribution patterns Pa, Pb are formed on the horizontal cut-off line CL of the base light distribution pattern Po, the contrast between the area above the horizontal cut-off line CL and the area below the horizontal cut-off line CL is reduced.

Accordingly, even when the vehicle is moving from a downward slope to a flat road surface or the like, the road surface ahead of the vehicle is prevented from suddenly becoming dark, and deterioration of the visibility on the distant road surface is suppressed. Also, even if the horizontal cut-off line CL is moved up and down due to pitching of the vehicle or the like, the light intensity is prevented from abruptly changing. Accordingly, the possibility of inflicting glare on the drivers of oncoming vehicles is decreased.

Also, even if the position of the light source 22*a* is slightly offset in the direction of the optical axis Ax because the additional reflectors 20L, 20R are provided on the sides of the lamp unit body 18, the additional light distribution patterns Pa, Pb are not displaced in the vertical direction. Accordingly, the additional light distribution patterns Pa, Pb can be formed on the cut-off line CL reliably.

Thus, according to the present invention, a low-beam light distribution pattern P which provides improved visibility for the driver of the vehicle and which reduces the possibility of inflicting glare on drivers of oncoming vehicles is obtained.

Particularly in the preferred embodiment, since the light source 22*a* is constituted by a filament which is arranged coaxially with the optical axis Ax, the additional light distribution patterns Pa, Pb can be formed as horizontally elongated and substantially uniform light intensity distribution patterns extending along the horizontal cut-off line CL.

Further with regard to the above-described preferred embodiment, the additional light distribution pattern Pa extends along the upper level portion CLa of the horizontal cut-off line CL and intersects the upper level portion CLa in the vicinity of the upper edge. Also, the additional light distribution pattern Pb extends along the lower level portion CLb of the horizontal cut-off line CL and intersects the lower level portion CLb in the portion in the vicinity of the upper edge. Accordingly, the contrast between the area above the horizontal cut-off line CL and the area below the horizontal cut-off line CL is reduced over a broad range. In addition, the hot zone HZa which extends along the upper level portion CLa is formed below the upper level portion CLa of the horizontal cut-off line CL, and the hot zone HZb which extends along the lower level portion CLb is formed below the lower level portion CLb. Accordingly, visibility for the driver of the vehicle is further enhanced.

Also, since the pair of apertures 24*b* for allowing light from the light source 22*a* to reach the reflecting surfaces 20La, 20Ra of the additional reflectors 20L, 20R is formed on right and left sides of the reflector 24, both of the additional reflectors 20L, 20R can be mounted at positions which are relatively close to the light source 22*a*. Accordingly, a relatively large-sized additional light distribution pattern with relatively low light intensity can be obtained. As a result, light of greater luminous intensity than is actually required prevented from being radiated to an area above the cut-off line CL, and the possibility of inflicting glare on drivers of oncoming vehicles is further reduced.

Further, the light reflected from the portions of the reflector 24 which correspond to the two apertures 24*b* of the reflector 24 is replaced by light reflected from the additional reflectors 20L, 20R. Accordingly, the contrast between the area above the cut-off line CL and the area below the cut-off line CL is further reduced by the reflected light from the two additional reflectors 20L, 20R, in addition to the contrast reduction between the area above the cut-off line CL and the area below the cut-off line CL formed by the reflected light from the reflector 24 being reduced by the reflected light from the portions of the reflector 24 that correspond to the two apertures 24*b*.

It should further be apparent to those skilled in the art that various changes in form and detail of the invention as shown and described above may be made. It is intended that such changes be included within the spirit and scope of the claims appended hereto.

What is claimed is:

1. A projection-type vehicular headlamp producing a beam having a low-beam light distribution pattern including a cut-off line, comprising:

a light source disposed on an optical axis extending generally in a longitudinal direction of a vehicle upon which said headlamp is mounted;

a main reflector that reflects light from said light source forward along said optical axis;

a projection lens disposed forward of said reflector;

a shade disposed between said projection lens and said reflector, said shade blocking part of the light reflected by said reflector so as to form said cut-off line; and at least one additional reflector which forms an additional light distribution pattern superimposed over at least a portion of said cut-off line by reflecting light from said light source forward, said at least one additional reflector being provided on a side of said main reflector, and said additional light distribution pattern being symmetrical around an axis parallel with the cut-off line, wherein said additional light distribution pattern intersects said cut-off line above a center of said additional light distribution pattern and an upper edge of said additional light distribution pattern is above said cut-off line.

2. The vehicular headlamp according to claim 1, wherein said additional light distribution pattern extends along said cut-off line and intersects said cut-off line in the vicinity of the upper edge of said additional light distribution pattern.

3. The vehicular lamp according to claim 2, wherein said additional light distribution pattern has a portion of higher intensity below said cut-off line.

4. The vehicular headlamp according to claim 1, wherein an aperture for allowing light from said light source to reach said additional reflector is formed in said main reflector.

5. The vehicular headlamp according to claim 1, wherein said additional light distribution pattern has a hot zone therein formed below said cut-off line.

6. A projection-type vehicular headlamp producing a beam having a low-beam light distribution pattern including a cut-off line, comprising:

a light source disposed on an optical axis extending generally in a longitudinal direction of a vehicle upon which said headlamp is mounted;

a main reflector that reflects light from said light source forward along said optical axis;

a projection lens disposed forward of said reflector;

a shade disposed between said projection lens and said reflector, said shade blocking part of the light reflected by said reflector so as to form said cut-off line; and first and second additional reflectors which form respective first and second additional light distribution patterns extending over at least respective portions of said cut-off line by reflecting light from said light source forward, said additional reflectors being provided on respective opposite sides of said main reflector, wherein said first and second additional light distribution patterns intersect said cut-off line above centers of said first and second additional light distribution patterns, and said first and second additional light distribution patterns both have an upper edge that is above said cut-off line.

7. The vehicular headlamp according to claim 6, wherein said cut-off line has first and second portions having a level difference therebetween, said first portion being higher than said second portion, said first additional light distribution pattern extending along said first portion of said cut-off line, and said second additional light distribution pattern extending along said second portion of said cut-off line.

8. The vehicular headlamp according to claim 7, wherein said first and second additional light distributions patterns intersect said first and second portions, respectively, of said cut-off line in the vicinity of upper edges of said first and second additional light distribution patterns.

9. The vehicular headlamp according to claim 7, wherein said first and second additional light distribution patterns intersect one another adjacent a junction between said first and second portions of said cut-off line below said optical axis.

10. The vehicular lamp according to claim 7, wherein said first and second additional light distribution patterns each have a portion of higher intensity below said first and second portions of said cut-off line.

11. The vehicular headlamp according to claim 6, wherein first and second apertures for allowing light from said light source to reach said first and second additional reflectors, respectively, are formed in said main reflector.

12. The vehicular headlamp according to claim 6, wherein said additional light distribution patterns have a hot zone therein formed below said cut-off line.

13. A projection-type vehicular headlamp producing a beam having a low-beam light distribution pattern including a cut-off line, comprising:

a light source disposed on an optical axis extending generally in a longitudinal direction of a vehicle upon which said headlamp is mounted;

a main reflector that reflects light from said light source forward along said optical axis;

a projection lens disposed forward of said reflector;

a shade disposed between said projection lens and said reflector, said shade blocking part of the light reflected by said reflector so as to form said cut-off line, said cut-off line having first and second portions with a level difference therebetween; and first and second additional reflectors which form respective first and second additional light distribution patterns extending over at least respective portions of said cut-off line by reflecting light from said light source forward, said additional reflectors being provided on respective opposite sides of said main reflector, wherein said first and second additional light distribution patterns intersect one another adjacent a junction between said first and second portions of said cut-off line below said optical axis, and said first and second additional light distribution patterns both have an upper edge that is above said cut-off line.

14. The vehicular head lamp according to claim 3, wherein said portion of higher intensity has an intensity higher than other portions of said additional light distribution pattern.

15. The vehicular head lamp according to claim 10, wherein said portion of higher intensity of said first and second additional light distribution patterns has an intensity higher than other portions respectively of said additional light distribution patterns.

16. A projection-type vehicular headlamp producing a beam having a low-beam light distribution pattern including a cut-off line, comprising:

a light source disposed on an optical axis extending generally in a longitudinal direction of a vehicle upon which said headlamp is mounted;

a main reflector that reflects light from said light source forward along said optical axis;

a projection lens disposed forward of said reflector;

a shade disposed between said projection lens and said reflector, said shade blocking part of the light reflected by said reflector so as to form said cut-off line; and at least one additional reflector which forms an additional light distribution pattern superimposed over at least a portion of said cut-off line by reflecting light from said light source forward, said at least one additional reflector being provided on a side of said main reflector, and said additional light distribution pattern being symmetrical around an axis parallel with the cut-off line, wherein said additional light distribution pattern has a portion below said cut-off line which has two different areas of intensity, one of said areas having a higher level of intensity than the other area, and wherein an upper edge of the additional light distribution pattern is above said cut-off line.

17. A projection-type vehicular headlamp producing a beam having a low-beam light distribution pattern including a cut-off line, comprising:

a light source disposed on an optical axis extending generally in a longitudinal direction of a vehicle upon which said headlamp is mounted;

a main reflector that reflects light from said light source forward along said optical axis;

a projection lens disposed forward of said reflector;

a shade disposed between said projection lens and said reflector, said shade blocking part of the light reflected by said reflector so as to form said cut-off line; and first and second additional reflectors which form respective first and second additional light distribution patterns extending over at least respective portions of said cut-off line by reflecting light from said light source forward, said additional reflectors being provided on respective opposite sides of said main reflector, wherein said first and second additional light distribution patterns contact each other and each have a portion of intensity below said first and second portions of said cut-off line which is higher than other portions respectively of said additional light distribution patterns, and said first and second additional light distribution patterns both have upper edges that are above the cut-off line.

18. The vehicular head lamp according to claim 16, wherein said area of higher intensity is in a center of said additional light distribution pattern.

19. The vehicular head lamp according to claim 17, wherein said portion of higher intensity of said first and second additional light distribution patterns has an intensity higher than other portions respectively of said additional light distribution patterns.

* * * * *